United States Patent

[11] 3,616,220

[72] Inventors Robert E. Nisbet;
Ernest E. Allen, both of Decatur, Ill.
[21] Appl. No. 772,042
[22] Filed Oct. 30, 1968
[45] Patented Oct. 26, 1971
[73] Assignee A. E. Staley Manufacturing Company
Decatur, Ill.

[54] METHOD FOR PREPARING LOW D. E. STARCH HYDROLYZATES
5 Claims, No Drawings

[52] U.S. Cl. .................................................. 195/31,
127/29, 127/38, 99/141
[51] Int. Cl. ........................................................ C12b 1/00
[50] Field of Search........................................... 195/31, 2,
3, 4, 9, 11; 99/141, 142; 127/38, 40, 70, 71;
260/428

[56] References Cited
UNITED STATES PATENTS
2,610,132 9/1952 Newkirk et al. .............. 127/40
3,490,922 1/1970 Hurst............................ 99/142

OTHER REFERENCES
Schoch, " Methods in Carbohydrate Chemistry" R. L. Whistler, Vol. IV p. 56– 9, 1964

*Primary Examiner*—A. Louis Monacell
*Assistant Examiner*—Gary M. Nath
*Attorney*—Charles J. Meyerson ABSTRACT: Aqueous starch paste is acid converted to a hydrolyzate having a dextrose equivalent constant (D.E.) in the range of from about 8 to about 16 percent, then after removal of any insoluble fatty material present, the acid hydrolyzate is cooled for at least 1 hour at a temperature below about 60° F., e.g., in the range of from about 32° F. to about 50° F., and precipitated material formed then is separated from the chilled hydrolyzate liquor. The resultant hydrolyzates, as well as hydrolyzates formed by slight alpha-amylase conversion of the resultant liquor, form aqueous syrups having excellent stability against haze formation. The lower D.E. hydrolyzates produced also are essentially nonsweet and nonhygroscopic.

METHOD FOR PREPARING LOW D. E. STARCH HYDROLYZATES

DISCLOSURE OF THE INVENTION

The present invention relates to a process for producing starch hydrolyzates of low dextrose equivalent content (D.E.). More particularly, it relates to a method for preparing low D.E. starch hydrolyzates having properties rendering them useful as diluents, bulking agents, and the like in edible active ingredient-containing formulations designed to be dissolved in water for consumption, e.g., synthetic sweeteners and synthetic coffee whiteners.

Practical and technical considerations have combined in recent years to introduce into the market an expanding number of synthetic food products. Examples of such new materials are synthetic formulations used as substitutes for such natural foods as sugar, cream, and milk. Where possible, for convenience and ease of handling, the new synthetic foods have been produced in solid form. In some instances, due to the properties of the active ingredient or ingredients present, it is desirable to include an auxiliary material which extends and adds bulk to the formulation. The result is an increasing demand for bulking agents and fillers adapted for use in the synthetic food field.

Efforts to supply completely suitable bulking agents for synthetic foods heretofore generally have been unsuccessful. To be ideal a filler must be inexpensive, stable, water-soluble, low in caloric content, essentially tasteless, and nonhygroscopic. Few substances previously available have all of these characteristics. Hence, synthetic food formulators have been forced to resort to using bulking agents deficient in one or more respects.

Materials previously suggested for use as fillers for synthetic foods included low D.E. starch hydrolyzates. Their source being readily available, e.g., corn starch, and their basic preparation being relatively simple, it was felt these materials could be easily produced and priced suitably low. It also was found that, by varying the D.E. of the hydrolyzates, one or more of the properties highly desirable in a filler, e.g. non-hygroscopicity, were attainable. The reactions involved in a starch hydrolysis are complex, however, it was observed that achievement of a desirable property often was attended by the loss of another. For example, attempts to achieve minimum sweetness by lowering the product D.E. yielded materials of poor solubility. On the other hand, efforts to improve water-solubility by increasing the D.E. has resulted in products undesirably sweeter and more hygroscopic. A further serious drawback of low D.E. starch hydrolyzates heretofore available is that they usually form aqueous solutions which become cloudy on standing.

In attempting to solve such disadvantages of starch hydrolyzates as fillers and bulking agents, several approaches have been tried. For example, Newkirk et al., in U.S. Pat. No. 2,610,132, disclose that haze-forming components in low D.E. starch hydrolyzates can be precipitated and removed by cooling the hydrolyzates in the presence of fats at temperatures in the range of 60° F. to about 140° F. While this approach does offer some improvement, it is not, however, successful in removing the haze-forming materials completely. Another approach is described by Snyder et al., in U.S. Pat. No. 2,965,520. In this patent, the authors state that low D.E. starch hydrolyzate syrups having increased stability toward haze formation can be produced by initially acid hydrolyzing a starch paste to a D.E. content in the range of from about 18 to about 32 percent and, after the insolubles are removed, treating the acid hydrolyzate liquor with alpha-amylase to slightly increase its D.E. A drawback of such processes is the production of hydrolyzates which were relatively sweet and hygroscopic. The best overall process heretofore available for providing low D.E. hydrolyzates of the properties described above employs a combination of modifications of the Newkirk et al. and Snyder et al. processes. In such a process, the starting paste is initially acid hydrolyzed to a relatively low D.E., e.g., from about 8 to about 12 percent, the acid hydrolyzate is held for at least an hour at a moderate cooling temperature, e.g., one on the order of from about 80° to about 135° F., to precipitate fats and unconverted starch, and, after the precipitate is removed, the resultant liquor is treated with alpha-amylase to increase its D.E. to a value corresponding to a conversion of potentially (retrogradable) polysaccharides to lower molecular weight components which are suitably soluble and stable in the ultimate syrups formed. A typical final D.E. of such hydrolyzates, for example, is one in the range of from about 15 to about 22 percent. Although such hydrolyzates are superior in regard to overall properties to those previously available, some embodiments still retain a slight tendency to haze in concentrated aqueous solution form. Accordingly, a search has continued in the art for improved methods of producing low D.E. hydrolyzates which form haze-free solutions and are suitable synthetic food bulking agents.

Accordingly, an object of the present invention is to provide an improved method for producing low D.E. starch hydrolyzates.

It is another object of the present invention to provide a simple and inexpensive method for producing low D.E. starch hydrolyzates having properties rendering them useful as auxiliary agents in the formulation of edible, active ingredient-containing powder.

A further object of the present invention is to provide a method for producing low D.E. starch hydrolyzates which are essentially completely water-soluble and relatively nonhygroscopic and tasteless.

A still further object of the present invention is to provide a method of producing a low D.E. starch hydrolyzate having an acceptable balance between taste, solubility, hygroscopicity, and other properties, and which produces aqueous syrups having good stability toward haze formation when allowed to stand for extended periods such as during storage and the like.

Other objects of the invention will be apparent from the description of the invention which follows:

Broadly described, the present invention provides a method for producing a low D.E. starch conversion product which comprises heating an acid-containing aqueous starch slurry at an elevated temperature to convert said slurry to a starch paste and effect the hydrolysis of the resultant paste to a starch acid hydrolyzate having a D.E. in the range of from about 8 to about 16 percent then, in the substantial absence of fats, cooling the hydrolyzate without freezing to a reduced temperature below about 60° F., holding the cooled hydrolyzate at said reduced temperature for at least 1 hour to effect precipitation of polysaccharides from the resultant cooled liquid, and thereafter separating the precipitated material from the cooled liquid. D.E., as usual, is expressed as percent by weight, dry substance basis.

In certain preferred embodiments of the present method, the cooled liquor obtained thereafter is further converted with an enzyme preparation such as alpha-amylase to further improve certain hydrolyzate properties, e.g., haze stability. In such embodiments, for example, it is typical in a subsequent alpha-amylase treatment to increase the D.E. of the precipitate-free liquor to a value above about 12 percent, and more usually in the range of from about 12 to about 22 percent by weight, dry substance basis.

In the more preferred embodiments of the present method, the necessary acid hydrolysis in the first step is carried out by initially heating an acid-containing aqueous starch slurry essentially instantaneously and uniformly to a temperature in the range of 250° to 350° F. in a suitable heater, e.g., a steam injection heater, with superheated steam and then holding the resultant hot starch paste within said elevated temperature range under pressure for a time period requisite for hydrolysis to proceed to the desired degree. Cooling of the acid hydrolyzate intermediate to temperatures below reaction temperatures then is carried out rapidly such as by flashing the hot hydrolyzate under atmospheric or a more reduced pressure.

The process of the present invention advantageously produces starch hydrolyzates of such water-soluble properties that they yield aqueous syrups having excellent resistance toward haze formation even over relatively long storage periods. The preferred low D.E. products produced, moreover, are suitably tasteless (nonsweet) and nonhygroscopic. Furthermore, although polysaccharides are precipitated and removed from product liquor in the present method, there need be little material loss in the overall process. The precipitate, as described hereinafter, advantageously may be recycled in the process to the acid conversion step wherein it is converted to product.

A suitable starting material in the present invention is an acidified aqueous slurry of unmodified starch. The preferred starch is corn starch due to its availability and low cost. The source of the starch is not critical, however, and starch derived from other cereals and root materials as wheat, rice, potatoes, tapioca, and the like can also be used. As is known, such starches normally contain a small percentage of fats. The invention encompasses their use, as well as starch products derived therefrom by a treatment, such as solvent extraction, to remove at least a portion of their normal fat content.

In the starting starch slurries, the starch concentration may vary over a relatively wide range, e.g., from about 50 to about 45 percent by weight. In order to minimize recovery costs (e.g., evaporation expenses), the starch concentration is generally as high as the initial viscosity of the paste formed in the process will allow. The more preferred starch concentrations usually are in the range of from about 30 percent to about 40 percent by weight of the slurry. The acid catalyst and slurry pH conditions may be suitably those conventionally used in processes for acid converting starch. Typically, a strong mineral acid such as hydrochloric acid is added to the starting starch slurry to adjust its pH to a value in the range of from about 1.5 to about 2.5.

In accordance with the present method, an acidified aqueous starch slurry is initially heated to an elevated temperature above the gelatinization range of the starch, whereby the starch is pasted and simultaneously hydrolyzed by the acid present, and the mass is then held at such elevated temperature conditions for a sufficient time period for the starch mass to be further hydrolyzed to a hydrolyzate having a D.E. in the range of from about 8 to about 16 percent, preferably from about 8 to about 14 percent. Control of the D.E. in the first step is important to ensuring final hydrolyzate quality. Overconversion increases the amount of dextrose produced and thus makes the ultimate hydrolyzates too sweet and hygroscopic. Underconversion undesirably increases processing costs, e.g., the acid hydrolyzates of too low a D.E. contain greater amounts of high molecular weight polysaccharide material which must be removed and recycled in the intermediate steps of the process. This also can lead to problems due to contaminant buildup in equipment. In embodiments wherein a subsequent enzyme treatment is employed, increased levels of enzyme and/or longer times are also required to further process the liquors obtained after removal of insolubles. In the more preferred embodiments of the present method, problems due to these factors can be minimized by controlling the acid hydrolysis to provide hydrolyzates having a D.E. in the range of from about 8 to about 12 percent.

Elevated temperatures conventionally employed in starch acid hydrolyzate processes are suitable for use in the initial acid treating step of the present process. In actual embodiments, the particular temperature employed is a compromise between competing factors. Higher temperatures, for example, allow the use of higher starch concentrations and shorter holding times and generally mean improved product uniformity. Increased temperatures, on the other hand, also result in increased color formation in the hydrolyzates. For most applications, temperatures providing an optimum balance between such factors fall in the range of from about 250° to about 350° F.

Holding periods employed in the initial acid treating step of the present method vary, depending primarily on the concentrations of starch and acid in the starting slurry and the temperature conditions used, and the D.E. of the desired hydrolyzate. In embodiments employing preferred conditions, i.e., high starch concentrations, optimum heating temperatures, and efficient heater designs, holding times for producing the desired D.E. hydrolyzates generally are on the order of from about 5 to about 20 minutes.

The heating for the initial acid treatment step suitably may be carried out by indirect heat exchange, direct heat exchange, or combinations thereof. A highly preferred type of heater is one which effects the heating rapidly and essentially uniformly. Steam injection-type heaters, exemplified by those disclosed in U.S. Pat. Nos. 2,805,955; 3,197,337; and 3,219,483, have this characteristic and, hence, constitute a preferred heater design. In such heaters, live steam is injected into and mixed with starch slurry feed in the throat of a jet. By adjusting the pressures of the inlet streams and outlet stream of such injection heaters, the temperature of the hot starch paste formed can be varied as desired. A suitable heater for use operating on the indirect heating principle is exemplified in U.S. Pat. 2,481,436 wherein a starch slurry is pumped in the form of a thin film through an annulus formed between a stationary shell and a rotating inner member and heated indirectly by steam. Other suitable heaters are shown in U.S. Pat. Nos. 3,067,067 and 3,103,451.

The requisite holding of the hot acid-containing mass in the initial acid conversion step suitably can be carried out in any conventional manner which is convenient. The heaters employed, for example, also can serve as the holding zone or, as is common in continuous conventional acid hydrolysis processes, the hot paste can be passed from the heater to a separate holding zone maintained under sufficient pressure to keep the paste temperature at the desired elevated level. Typical separate holding zones are provided by tanks and coils of tubing of sufficient lengths to provide, at the flow rates obtaining, the desired hydrolysis periods.

In accordance with the present method, the hydrolyzate mass produced in the acid treatment then is further treated, the particular treatment used depending upon the nature of the hydrolyzate material. If the starting starch hydrolyzate is already essentially free of fats, the acid hydrolyzate is cooled to below 60° F. with or without preliminary pH adjustment or concentration.

On the other hand, if the acid hydrolyzate obtained in the first process contains fats, as indicated by the formation of a light, yellow precipitate in the hydrolyzate liquid the hydrolyzate (with or without a preliminary pH adjustment or concentration), must be treated to effect separation and removal of essentially all fats present before it is cooled to below 60° F. Such fat separation and removal, where necessary, suitably may be carried out in the conventional manner using a solvent extraction, filtration, centrifugation or the like treatment of the hydrolyzate while hot or after at least some cooling. One preferred technique, for example, involves centrifuging the acid hydrolyzate after partial cooling it by flashing under atmospheric pressure to temperatures on the order of 200°–212° F. Another involves postponing centrifugation until partial cooling of the hot hydrolyzate mass reduces its temperature to within a range of from about 80° to about 140° F. Still another method utilizes a combination of partial cooling and centrifugation.

Regarding the above-mentioned preliminary treatments which optionally can be employed prior to the described cooling steps, a concentration treatment, in general, is employed only if the starting solids content is below about 30 percent by weight, d.s.b. The more preferred embodiments, on the other hand, all employ at least a partial neutralization treatment prior to or at least during cooling. In such embodiments, the pH of the hydrolyzate mass (to be or being cooled) is usually adjusted to within the range of from about four to about seven by the addition an alkaline material such as sodium hydroxide or sodium carbonate.

The main cooling step of the process of the invention then is carried out whereby the acid hydrolyzate, in the substantial absence of fats, is cooled to and maintained at a temperature below about 60° F., preferably in the range of from about 32° F. to about 50° F., to effect precipitation of polysaccharides which, if not removed or subsequently enzyme converted, ultimately could become insolubilized and lower the quality of the process hydrolyzate product.

In actual embodiments the desired cooling may be carried out in any convenient equipment such as indirectly cooled heat exchangers, flash chambers maintained under reduced pressure, and, where the more concentrated liquors are employed, quench towers using previously cooled hydrolyzate as the quench stream. In the preferred embodiments, the hot mass is flashed and cooled to the order of 200° to 212° F. with any remaining cooling being carried out in indirect heat exchangers. After the hydrolyzate has been cooled to the desired reduced temperature, a pH adjustment, if not previously carried out, may be effected in the manner and to the degree described above.

As stated, the cooled hydrolyzate is held and maintained at temperatures within the described reduced temperature range to effect the precipitation of potentially insolubilizable polysaccharides. A surprising feature of the present invention is that a greater percentage of such materials are precipitated and can be removed than is possible by following the prior art teaching, exemplified by the above-mentioned Snyder et al. patent, which is to cool in the presence of fats when desiring to remove insolubilizable starch from low D.E. hydrolyzates. The result is that the hydrolyzates obtained from the treatment of the present invention form syrups having significantly greater stability as compared to treated hydrolyzates produced by prior art approaches.

With regard to holding times used in the main cooling step, those actually employed generally are a compromise between cost and improvement attained by their use. At least 1 hour generally is required for significant precipitation to occur, with the longer and more extensive holding times, e.g., those ranging up to and over 42 hours, increasing the amount of precipitate formed. Holding times intermediate this range, namely, those in the range of from about 1.5 to about 20 hours, have proven advantageous in the preferred embodiments of the instant process.

The insolubilized material formed in the cooling step (which essentially comprises retrograded starch) is then removed. Although the separation of the precipitate can be carried out by any conventional means, the use of centrifuges is particularly advantageous. If desired, all or a portion of the separated polysaccharide precipitate may be, and preferably is, in continuous operations recycled in the process and added to fresh starch slurry or paste fed to the zone wherein the acid hydrolysis step of the process is conducted.

In one aspect of the invention, the resultant hydrolyzate liquor from which the precipitated polysaccharide material has been removed then is finished and concentrated in the manner conventional to processes for producing starch hydrolyzate products. In one approach, for example, the liquor may be concentrated to a syrup, refining treatments using solid sorbents such as carbon and/or ion exchange resins being employed before, during, and/or after completion of the concentration. In another embodiment, the liquor or syrup, after being similarly refined, is converted to a solid product using spray drying or another conventional rapid dewatering technique.

In another embodiment of the invention, the aqueous hydrolyzate liquor obtained after separation of the precipitate formed in the chilling step is further converted with an enzyme such as alpha-amylase to further improve certain properties. For example, although the hydrolyzate liquor obtained after separation of the polysaccharide precipitate formed in the main cooling step of the invention, i.e., cooling to below 60° F., forms a syrup having excellent stability toward haze formation, products of even better haze stability are produced using a subsequent alpha-amylase conversion to slightly raise the D.E. of the hydrolyzate. Typical enzyme treatments provide hydrolyzates having a D.E. in the range of from about 12 to about 22 percent. Such an enzyme treatment, when utilized, is usually carried out directly on the fat-free hydrolyzate liquor obtained from the chilling treatment. As in the previous stages of the process, however, an intermediate pH adjustment, concentration, or other conventional treatment may also be employed, where desired or appropriate, to ready the material for enzyme conversion.

The enzyme conversion step can be suitably carried out under widely varying conditions. There is nothing critical about the conditions utilized, and in general any conditions conventionally employed for the conversion of a starchy substrate by an enzyme such as alpha-amylase are suitable for use. In typical processes an alpha-amylase preparation derived from cultures of fungi such as *Aspergillus niger* or bacteria such as *Bacillus subtilus* is used to convert the hydrolyzate at pH within the range of from about 5.5 to about 7.0 and at a temperature ranging from about 150° F. to about 190° F. Enzyme concentrations are generally those which allow the desired product (e.g., a 12–22 percent D.E. hydrolyzate), to be achieved within feasible reaction times e.g., from about 15 minutes to about 4 hours). When products of the lower degrees of conversion are desired, an alpha-amylase preparation more preferably is employed which is essentially free of glucoamylase activity to avoid conversion of substrate directly to dextrose and thereby undesirably increase the sweetness and hygroscopicity of the ultimate hydrolyzate.

The hydrolyzate liquor obtained in the enzyme conversion step subjected to a treatment to inactivate residual enzyme. The particular treatment utilized is not critical, and any conventional treatment for inactivating the particular enzyme present is suitable for use. For alpha-amylase, such methods usually involve a suitable shift of the pH, a heat treatment at an elevated temperature such as above about 200° F., or both. Since heating may give rise to the formation of colored contaminants and the desired inactivation satisfactorily may be carried out by simply sufficiently acidifying the hydrolyzate, e.g., by lowering the pH to the range of 4.0 to 4.5 with a mineral acid such as hydrochloric acid, the acidification alone is the route preferred for alpha-amylase inactivation.

Following deactivation, the enzyme hydrolyzate may be refined and concentrated to syrupy or solid products in the manner described above.

The present invention having been described in detail, the following specific examples are presented to show additional embodiments of the method and product thereof. It is to be understood the examples are given for illustration purposes only and not by way of limitation.

EXAMPLE I

An 18°Be' aqueous slurry of unmodified corn starch was acid converted with hydrochloric acid at a pH of about 2.0 and a temperature of about 270° F. in a continuous steam injection heater and then flashed to atmospheric pressure to provide a hot, acid hydrolyzate having a D.E. of about 9.4 percent. The hot, acid hydrolyzate, which contained an insoluble yellow fraction of fats, initially was neutralized to a pH of about 4.5 with soda ash and then was divided into two portions. One portion remained untreated and served as the control. The other sample was centrifuged at about 200° F. to remove the insoluble fat fraction. The control and centrifuged hydrolyzates then were further divided into 1,600 cc. samples and samples of both were held for about 16 hours in stainless steel pots placed in separate water baths, one at 32° F. and one at 100° F. At the end of this holding period, the respective cooled samples each were then centrifuged to remove precipitate. The amount of precipitate removed from each sample is shown in table 1 below. After a pH adjustment to about 5.8 with soda ash, samples of each of the liquors were then refrigerated at about 35° F. for similar periods ranging up to 344 hours. Following the particular refrigeration period employed, a sample was centrifuged to determine the amount of precipitate formed. The amounts observed for the respective samples are listed in table 1 below.

than 1 hour subsequent enzymatic conversion. The data also shows that the alternative procedures required the subsequent use of longer hydrolysis periods with an attendant greater increase in hydrolyzate D.E. to achieve comparable stability.

TABLE 1

| Sample type | Cooling temperature, °F. | Acid hydrolyzate D.E., percent wt., d.s.b. | Precipitate, volume percent | | | | | | |
|---|---|---|---|---|---|---|---|---|---|
| | | | 0 hrs.[1] | 10 hrs.[1] | 39 hrs.[1] | 56 hrs.[1] | 128 hrs.[1] | 152 hrs.[1] | 344 hrs.[1] |
| A (fat absent) | 100 | 12.3 | 4.7 | 20.0 | 30.0 | 33.3 | 37.7 | 35.3 | 35.3 |
| B (fat present) | 100 | 12.0 | 15.4 | 0.5 | 19.3 | 23.3 | 30.7 | 30.3 | 32.7 |
| Do | 32 | 12.3 | 20.0 | 0 | 4.5 | 8.0 | 18.5 | 20.3 | 21.0 |
| A (fat absent) | 32 | 11.5 | 26.0 | 0 | 0 | 0 | 3.3 | 4.5 | 8.0 |

[1] Refrigeration time.

The data listed in table 1 clearly demonstrate the extent and unexpected nature of the advantages of the method of the present invention. As shown by the data, the run made according to the invention by cooling to a temperature below 60° F., in the substantial absence of fats, removed significantly more insolubilizable polysaccharides and provided hydrolyzate liquors significantly more stable toward subsequent precipitate formation than the other cooling techniques. The data further show that the attainment of the maximum amount of insolubilizable polysaccharide material at temperatures above about 60° F. requires the presence of fats. This follows what would be expected from the disclosure of the above-mentioned Snyder et al. patent. The method of the present invention, at the cooling temperatures employed, surprisingly provides significantly improved results by the directly opposite route, namely, without the use of fats to enhance precipitation. It further will be noted that although the hydrolyzate produced by the present method has the greatest stability against precipitate formation, it surprisingly has the lowest D.E., rendering it excellently suited for use as a diluent or bulking agent in such materials as powdered synthetic food formulations containing artificial sweetening agents, milk solid substitutes, and the like.

EXAMPLE II

Additional 300 cc. samples of each of the four hydrolyzates of example I obtained after cooling at 32° and 100° F. were adjusted to a pH of about 5.8 with soda ash. About 0.03 percent of an alpha-amylase preparation (Aquazyme 120, Novo Industri), dry solids basis, was added to each of the liquors and hydrolysis was effected by placing each of the liquors in separate stainless steel pots held in a 185° F. water bath. After conversion periods of 1 hour and of 2 hours, samples of the respective liquors were recovered, treated with carbon on a steam bath, and then filtered. Samples of the resultant liquors were then refrigerated as in example I and, after refrigeration, centrifuged to determine the amount of precipitate formed. The results of these tests are set forth in table 2.

The data listed in table 2 again demonstrate the improved stability of the hydrolyzates produced by the method of the present invention. It will be noted that the data shows that the present method produced lower D.E. hydrolyzates which were completely stable under the test conditions employed with less Further embodiments of this invention which do not depart from the spirit and scope thereof, of course, will be apparent to those skilled in the art. Accordingly, the foregoing is to be interpreted as illustrative only and the invention will be understood to be limited only by the scope of the appended claims.

What is claimed is:

1. A method for producing a low D.E. starch conversion product which comprises:
   a. heating an acid-containing aqueous starch slurry at an elevated temperature to convert said slurry to a starch paste and effect the hydrolysis of the resultant paste to a starch hydrolyzate having a D.E. in the range of from about 8 to about 16 percent,
   b. cooling the hydrolyzate without freezing to a reduced temperature below about 60° F.,
   c. holding the cooled hydrolyzate at said reduced temperature for at least 1 hour to effect precipitation of polysaccharides from the resultant cooled liquid, and
   d. thereafter separating the precipitated material from the cooled liquid,
   with the cooling and precipitation of the polysaccharide being conducted under conditions substantially free from fat.

2. The method according to claim 1 wherein the hydrolyzate mass obtained in said acid conversion step contains a water-insoluble fat fraction and said fat fraction is separated from the hydrolyzate liquid mass preliminary to the mass being cooled to below 60° F.

3. The method according to claim 2 wherein fat separation from said acid hydrolyzate mass is carried out by centrifuging the fat-containing liquor at a temperature in the range of from about 80° F. to about 212° F.

4. The method according to claim 1 wherein the hydrolyzate liquor obtained upon separation of said polysaccharide precipitate from said cooled hydrolyzate mass subsequently is subjected to enzyme conversion.

5. The method according to claim 4 wherein said hydrolyzate liquor from said polysaccharide precipitate separation step is converted with alpha-amylase to an enzyme hydrolyzate having a D.E. in the range of from about 12 percent to about 22 percent.

TABLE 2

| Sample type | Cooling temperature, °F. | Enzyme conversion time, hours | Enzyme hydrolyzate D.E., percent wt., d.s.b. | Precipitate, volume percent | | | | | |
|---|---|---|---|---|---|---|---|---|---|
| | | | | 10 hrs.[1] | 39 hrs.[1] | 56 hrs.[1] | 128 hrs.[1] | 152 hrs.[1] | 344 hrs.[1] |
| A (fat absent) | 100 | 1 | 13.2 | 0.0 | [2]0.0 | 0.3 | 6.0 | 7.6 | 10.0 |
| Do | 100 | 2 | 15.0 | 0.0 | 0.0 | 0.0 | 0.0 | [2]0.0 | 1.1 |
| B (fat present) | 100 | 1 | 13.1 | 0.0 | 0.0 | 0.0 | 0.2 | 0.7 | 5.7 |
| Do | 100 | 2 | 15.7 | 0.0 | 0.0 | 0.0 | 0.0 | 0.0 | 0.0 |
| Do | 32 | 1 | 13.9 | 0.0 | 0.0 | 0.0 | 0.0 | 0.0 | [2]0.0 |
| Do | 32 | 2 | 15.4 | 0.0 | 0.0 | 0.0 | 0.0 | 0.0 | 0.0 |
| A (fat absent) | 32 | 1 | 13.8 | 0.0 | 0.0 | 0.0 | 0.0 | 0.0 | 0.0 |
| Do | 32 | 2 | 14.9 | 0.0 | 0.0 | 0.0 | 0.0 | 0.0 | 0.0 |

[1] Refrigeration time.
[2] Visual cloudiness, but no measurable precipitate after 1 hour centrifuge.

UNITED STATES PATENT OFFICE
CERTIFICATE OF CORRECTION

Patent No. 3,616,220              Dated October 26, 1971

Inventor(s) Robert E. Nisbet; Ernest E. Allen

It is certified that error appears in the above-identified patent and that said Letters Patent are hereby corrected as shown below:

Abstract, line 2, for "constant" read ---content---

Column 2, line 7, for "potentially (retrogradable)" read ---potentially insolubilizable (retrogradable)---.
Column 3, line 25, for "about 50" read ---about 5---.
Column 6, line 23, for "times e.g." read ---times (e.g.---
Column 6, line 31, for "step subjected" read ---step is then subjected---.

Signed and sealed this 30th day of May 1972.

(SEAL)
Attest:

EDWARD M. FLETCHER, JR.          ROBERT GOTTSCHALK
Attesting Officer                 Commissioner of Patents